US012645257B2

(12) United States Patent
Weiss et al.

(10) Patent No.: US 12,645,257 B2
(45) Date of Patent: Jun. 2, 2026

(54) BIDIRECTIONAL RATCHET FOR ADJUSTING STRAP ON VIRTUAL REALITY HEADSET

(71) Applicant: Meta Platforms Technologies, LLC, Menlo Park, CA (US)

(72) Inventors: Simon Morris Shand Weiss, Seattle, WA (US); Brett Delainey Christie, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 266 days.

(21) Appl. No.: 18/496,546

(22) Filed: Oct. 27, 2023

(65) Prior Publication Data

US 2024/0143029 A1 May 2, 2024

Related U.S. Application Data

(60) Provisional application No. 63/381,506, filed on Oct. 28, 2022.

(51) Int. Cl.
*F16D 41/16* (2006.01)
*A43C 11/16* (2006.01)
*G06F 1/16* (2006.01)

(52) U.S. Cl.
CPC ............. *G06F 1/163* (2013.01); *F16D 41/16* (2013.01)

(58) Field of Classification Search
CPC ....... A43C 11/165; A43C 11/16; A43C 11/20; A43C 1/003; A43C 1/00; F16D 41/16; Y10T 24/2164; Y10T 24/2183; Y10T 24/2187; Y10T 24/3724; Y10T 24/3703; A42B 3/085; A42B 3/08
See application file for complete search history.

(56) References Cited

U.S. PATENT DOCUMENTS

| | | | |
|---|---|---|---|
| 4,466,523 A | 8/1984 | De Carolis et al. | |
| 7,174,575 B1 * | 2/2007 | Scherer ................. | A42B 3/145 |
| | | | 2/418 |
| 11,619,822 B2 * | 4/2023 | Jen ..................... | G02B 27/0176 |
| | | | 345/8 |
| 2010/0139057 A1 * | 6/2010 | Soderberg .......... | B65H 75/4434 |
| | | | 242/396.2 |
| 2020/0310488 A1 | 10/2020 | Lin et al. | |

FOREIGN PATENT DOCUMENTS

WO 2017108118 A1 6/2017

OTHER PUBLICATIONS

EPO—International Search Report and Written Opinion for International Application No. PCT/US2023/036245, mailed Feb. 22, 2024, 12 pages.

* cited by examiner

*Primary Examiner* — Jack W Lavinder
(74) *Attorney, Agent, or Firm* — McDermott Will & Schulte LLP

(57) ABSTRACT

As disclosed herein, a bidirectional ratchet for an anti-slippage knob-ratchet to adjust strap length for securing a virtual reality headset onto the head of a user is provided. In one aspect, the bidirectional ratchet may include a first pawl, configured to engage with a stationary ratchet drum in an outer housing to allow movement of a pinion in a clockwise direction. The bidirectional rachet may include a second pawl, configured to engage with the stationary ratchet drum to allow movement of the pinion in a counterclockwise direction. A knob system and a headset are also provided.

18 Claims, 6 Drawing Sheets

BIDIRECTIONAL RATCHET FOR ADJUSTING STRAP ON VIRTUAL REALITY HEADSET

CROSS-REFERENCE TO RELATED APPLICATIONS

The present application claims the benefit of priority under 35 U.S.C. § 119 from U.S. Provisional Patent Application Ser. No. 63/381,506 entitled "BIDIRECTIONAL RATCHET FOR ADJUSTING STRAP ON VR HEADSET," filed on Oct. 28, 2022, the disclosure of which is hereby incorporated by reference in its entirety for all purposes.

BACKGROUND

Field

The present disclosure is generally related to adjustable straps for wearable headsets. More specifically, the present disclosure is related to a non-slippage knob with a bidirectional ratchet for adjusting the straps in a virtual reality (VR) headset.

Related Art

VR headsets have fixture straps that tightly attach the headset to the user's head. While the straps are adjustable via a tightening mechanism, once the user removes the headset, a slippage of the tightening mechanism, in the direction opposite from the ratchet stoppage, may result in the loosening or tightening of the strap (more likely tightening), forcing the user to readjust the strap to fix the headset. This causes an inconvenience as the user typically needs to readjust the strap every time the user handles the headset while not wearing it.

SUMMARY

The disclosed system provides for a bidirectional ratchet of a rotating knob connecting the straps of a virtual reality (VR) headset. Turning the knob in one direction loosens the straps, and turning the knob in the opposite direction tightens the straps. The knob maintains the loosened or tightened position without slipping, allowing a user to avoid further or unintentional adjustments to the straps.

According to certain aspects of the present disclosure, a bidirectional ratchet is provided. The ratchet may include a first pawl, which may be configured to engage with a stationary ratchet drum in an outer housing to allow movement of a pinion in a clockwise direction. The ratchet may include a second pawl, which may be configured to engage with the stationary ratchet drum to allow movement of the pinion in a counterclockwise direction.

According to other aspects of the present disclosure a knob system for adjusting a strap length of a headset is provided. The knob system may include a rotating cap, which may include a strap lengthening configuration, a strap-shortening configuration, and a strap-locking configuration. The knob system may include a ratchet coupled to the rotating cap. The ratchet may be configured to rotate in a clockwise direction when the rotating cap is in the strap-lengthening configuration, and it may rotate in a counterclockwise direction when the rotating cap is in the strap-shortening configuration. The rotating cap may remain still when the rotating cap is in the strap-locking configuration.

The knob system may further include a pinion mechanically coupled, either rigidly or through a torsion spring, to the ratchet at a hub, and to a left headset strap on a first edge of the left headset strap and to a right headset strap on a second edge of the right headset strap. The knob system may include a housing. The housing may include a strap coupling to receive the left headset strap and the right headset strap. The housing may include a stationary ratchet drum to engage with the ratchet in a stop-hold configuration when the rotating cap is in the strap-lengthening configuration or in the strap-shortening configuration, and in a lock configuration when the rotating cap is in a lock configuration.

According to yet other aspects of the present disclosure, a headset is provided. The headset may include a visor, which may include a display configured to provide an immersive reality view to a user. The headset may include a left strap attached to a left side of the visor, and the headset may include a right strap attached to a right side of the visor. The left strap and the right strap may be coupled on an opposite side of the visor by a knob. The knob may include a bidirectional ratchet to enable a strap-lengthening configuration, a strap-shortening configuration, and a strap-locking configuration.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

In some cases, straps in VR headsets adjust to a larger or smaller size when the VR headset is not on the user's head. For example, when the headset is picked up by the top strap, a small force is generated that tends to lengthen or shorten the strap size. The user is then forced to readjust the strap size prior to use of the headset.

It is desirable to hold a strap for a VR headset under tension and compression (e.g., bidirectionally) of the straps. Such configuration allows users to set a desirable extension of the straps holding the headset at once, without having to reset every time the headset is tried on. In some embodiments, the strap may be hard or rigid, and in some embodiments the strap may be flexible, wherein the user may still desire to maintain a given size between uses and or handling procedures.

To achieve the above result, an anti-slippage knob-ratchet is provided. The knob includes a bidirectional ratchet and a rotating cap that adjusts the direction of the ratchet in order to lengthen or shorten the straps around the head of the user. Once the strap length is adjusted, the rotating cap is set in a locked position, wherein ratchet pawls acting in clockwise and counterclockwise directions engage a stationary ratchet drum, securing the length of the strap from slippage in either direction.

In addition to removing the inconvenience for the user of continually readjusting the strap length, embodiments as disclosed herein reduce the wear of mechanical components in the ratchet caused by multiple readjustments of the strap length.

Figure 1:
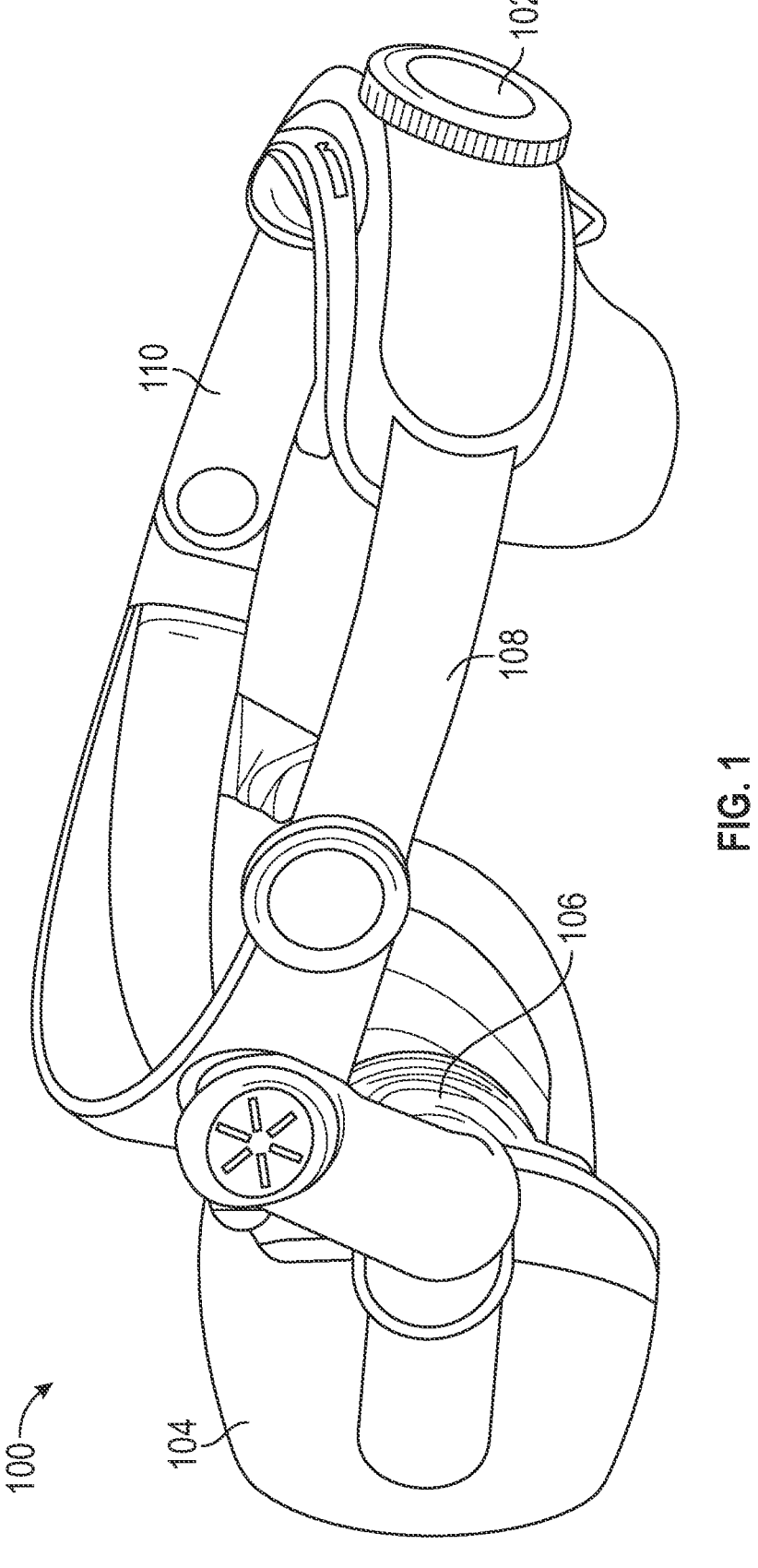
FIG. 1 illustrates a virtual reality (VR) headset having a strap adjustable with an anti-slippage knob-ratchet, according to some embodiments.

Turning now to the figures, FIG. 1 illustrates a VR headset 100 having a strap adjustable with an anti-slippage knob-ratchet 102, according to some embodiments. VR headset 100 may include a visor 104, including a display 106 configured to provide an immersive reality view to a user. VR headset 100 may also include a left strap 108 attached to a left side of visor 104 and a right strap 110 attached to a right side of visor 104. Left strap 108 and right strap 110 may be coupled on an opposite side of visor 104 via an anti-slippage knob-ratchet 102. Anti-slippage knob-ratchet 102 may include a bidirectional ratchet 212 (see FIG. 2) to enable a strap-lengthening configuration, a strap-shortening configuration, and a strap-locking configuration.

In some embodiments, anti-slippage knob-ratchet 102 may operate such that left strap 108 and right strap 110 remain fixed in a given configuration unless the user adjusts anti-slippage knob-ratchet 102. Rotating anti-slippage knob-ratchet 102 unlocks corresponding bidirectional ratchet pawls 214 (see FIG. 2) for the direction of adjustment, and then rotates pinion 302 (anti-slippage knob-ratchet knob 102 acting through bidirectional ratchet 212, into a pinion 302 (see FIG. 3)) and retracts or extends straps 108 and 110. When anti-slippage knob-ratchet 102 is not engaged in one direction or another, straps 108 and 110 are prevented from extending or contracting because bidirectional ratchet 212 is in the locked position. This prevents accidental strap length change. Accordingly, adjustment of the strap length can only occur through rotation of anti-slippage knob-ratchet 102. No other input is required from the user to adjust straps 108 and 110 other than rotating anti-slippage knob-ratchet 102.

In some embodiments, VR headset 100 may include a processor circuit and a memory circuit. The memory circuit may store instructions which, when executed by the processor circuit, cause the headset to execute one or more steps in a method. In addition, VR headset 100 may include a communications module. The communications module may include radio frequency software and hardware configured to wirelessly communicate the processor and the memory with an external network, and a remote server or a mobile device handled by the user of VR headset 100. Accordingly, the communications module may include radio antennas, transceivers, and sensors, and also digital processing circuits for signal processing according to any one of multiple wireless protocols, such as Wi-Fi, Bluetooth, near-field communication (NFC), and the like. In addition, the communications module may also communicate with other input tools and accessories cooperating with VR headset 100 (e.g., handle sticks, joysticks, mouse, wireless pointers, and the like). The network may include, for example, any one or more of a local area network, a wide area network (WAN), the Internet, and the like. Further, the network may include, but is not limited to, any one or more of the following network topologies, including a bus network, a star network, a ring network, a mesh network, a star-bus network, tree or hierarchical network, and the like. VR headset 100 may include a battery for tethered or for untethered use of VR headset 100.

In some embodiments, VR headset 100 may include a rigid or semi-rigid strap. In some embodiments, anti-slippage knob-ratchet 102 works with a flexible, non-rigid strap. In some embodiments, at least one of left strap 108 or right strap 110 may be made of a rigid material having multiple teeth (see FIG. 3) at an end that engages pinion 302 that pulls left strap 108 and right strap 110 together in the strap-shortening configuration and pushes left strap 108 and right strap 110 apart in the strap-lengthening configuration.

Figure 2:
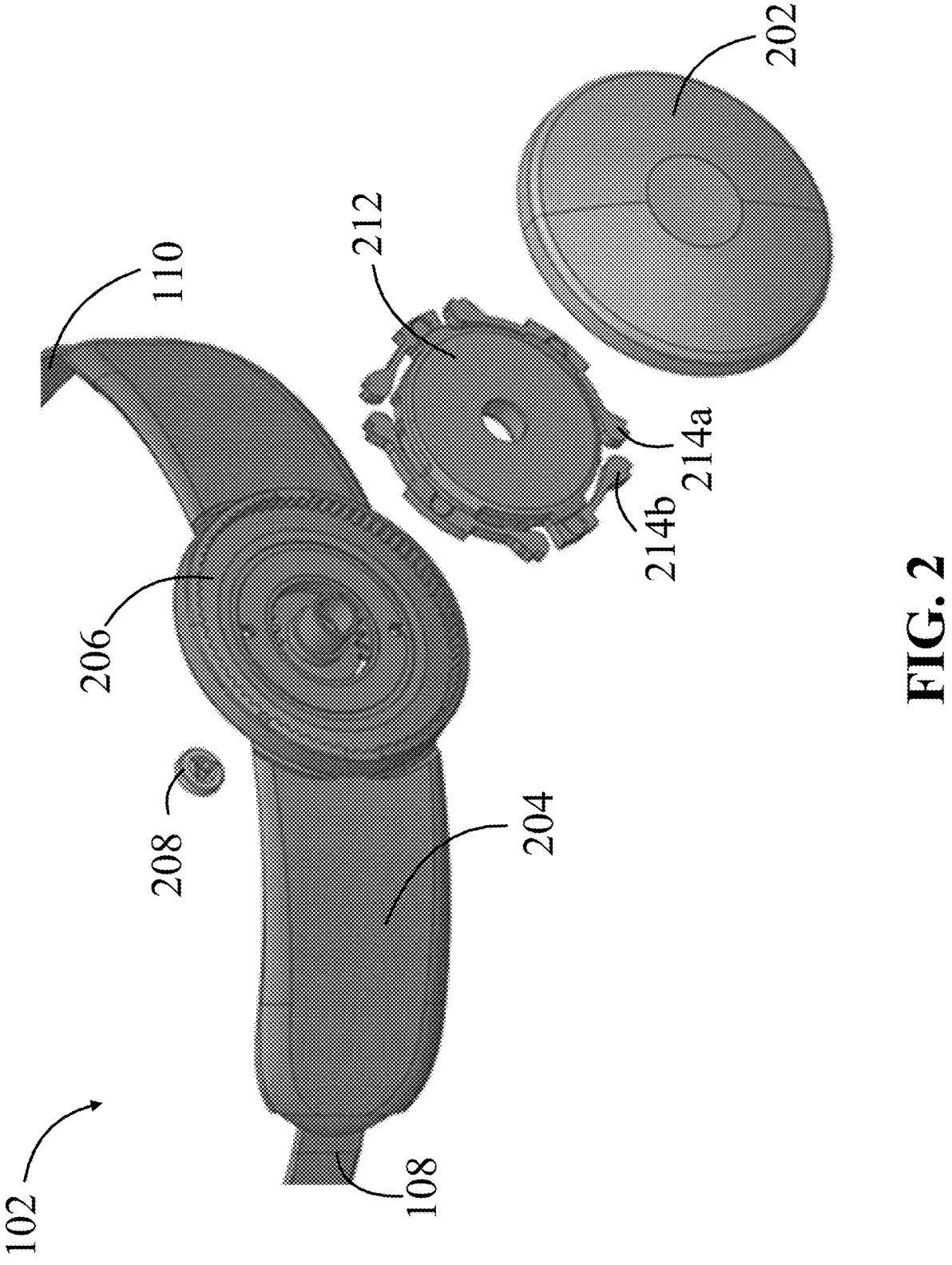
FIG. 2 illustrates an exploded perspective view of the components in an anti-slippage knob-ratchet for adjusting a strap on a VR headset as shown in FIG. 1, according to some embodiments.

FIG. 2 illustrates an exploded perspective view of the components in an anti-slippage knob-ratchet 102 for adjusting a strap on a VR headset 100 as shown in FIG. 1, according to some embodiments. Illustrated are a rotating cap 202, a strap case 204, left strap 108, right strap 110, housing 206, fastener 208, bidirectional ratchet 212, clockwise pawl 214a, and counterclockwise pawl 214b. Housing 206 of anti-slippage knob-ratchet 102 may include a stationary ratchet drum 602 (see FIG. 6.). Some of the teeth in left strap 108 and right strap 110 that engage pinion 304 (see FIG. 3) are also illustrated. Rotating cap 202 may be set in three different configurations: a strap-shortening configuration, a strap-lengthening configuration, and a strap-locking configuration. Strap case 206 may receive the ending of left strap 108 and right strap 110 to securely couple them via pinion 302 with bidirectional ratchet 202.

In some embodiments, anti-slippage knob-ratchet 102 may include stationary ratchet drum 602 and rotating cap 202, and bidirectional ratchet 212 may include multiple pawls 214, including at least one clockwise pawl 214*a* configured to engage with stationary ratchet drum 602 and at least one counterclockwise pawl 214*b* configured to disengage from stationary ratchet drum 602, or vice versa, by unlocking ribs 304 in rotating cap 202, when rotating cap 202 is on one of the strap-lengthening configuration or the strap-shortening configuration.

In some embodiments, anti-slippage knob-ratchet 102 may include stationary ratchet drum 602 and rotating cap 202, and bidirectional ratchet 212 may include at least one clockwise pawl 214*a* and at least one counterclockwise pawl 214*b* configured to engage stationary ratchet drum 602 when rotating cap 202 is set in the strap-locking configuration.

In some embodiments, anti-slippage knob-ratchet 102 may include stationary ratchet drum 602 and rotating cap 202, and bidirectional ratchet 212 may include at least one clockwise pawl 214*a* and at least one counterclockwise pawl 214*b* that include a head forming a cantilever with a body of bidirectional ratchet 212 to engage with stationary ratchet drum 602 when unimpeded by at least one unlocking rib 304 in rotating cap 202.

In some embodiments, bidirectional ratchet 212 includes a first group of multiple pawls 214 symmetrically disposed around a pinion 302 and configured to allow pinion 302 to move in a clockwise direction to pull left strap 108 and right strap 110 together, and a second group of multiple pawls 214 symmetrically disposed around pinion 302 and configured to allow pinion 302 to move in a counterclockwise direction to push left strap 108 and right strap 110 apart. In some embodiments, the symmetrical disposition of clockwise pawls 214*a* or counterclockwise pawls 214*b* is unnecessary and may include at least one or more pawls 214 disposed in a different configuration.

In some embodiments, rotating cap 202 may include a strap-lengthening configuration, a strap-shortening configuration, and a strap-locking configuration. Bidirectional ratchet 112 may be coupled to rotating cap 202 and configured to rotate in a first direction when rotating cap 202 is in the strap-lengthening configuration, to rotate in a second direction when rotating cap 202 is in the strap-shortening configuration, and to remain in a fixed position when rotating cap 202 is in the strap-locking configuration.

In some embodiments, a pinion 302 may be coupled to bidirectional ratchet 212 at a hub, and to a left headset strap 108 on a first edge of left headset strap 108 and to a right headset strap 110 on a second edge of right headset strap 110.

In some embodiments, housing 206 may include a strap coupling to receive left headset strap 108 and right headset strap 110. In some embodiments, housing 206 may include a stationary ratchet drum 602 to engage with bidirectional ratchet 212 in a stop-hold configuration when rotating cap 202 is in the strap-lengthening configuration or in the strap-shortening configuration, and in a lock configuration when rotating cap 212 is in the strap-locking configuration.

Figure 3:
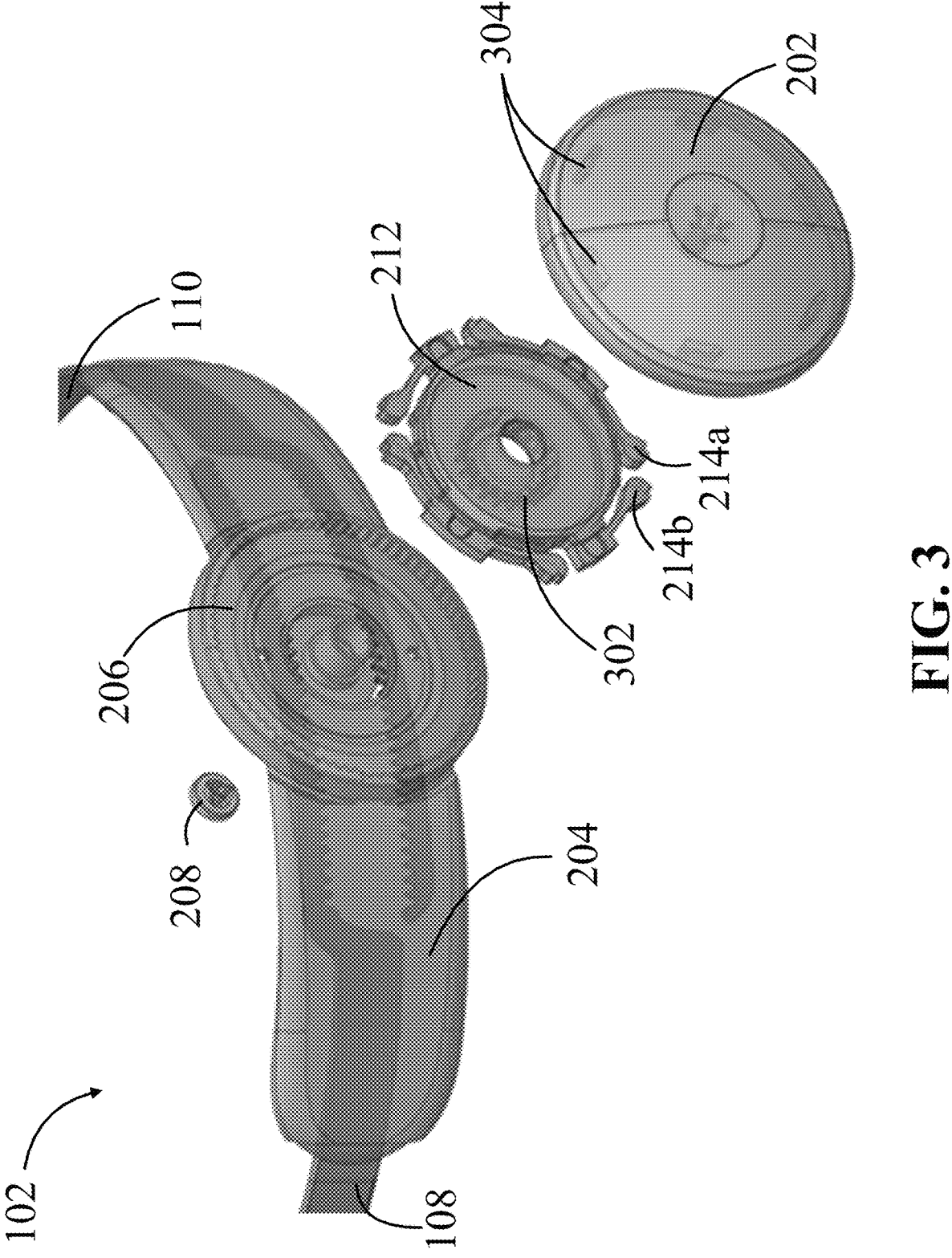
FIG. 3 illustrates an exploded transparent perspective view of the components in an anti-slippage knob-ratchet for adjusting a strap on a VR headset as shown in FIG. 1, according to some embodiments.

FIG. 3 illustrates an exploded transparent perspective view of the components in an anti-slippage knob-ratchet 102 for adjusting a strap on a VR headset 100 as shown in FIG. 1, according to some embodiments. Illustrated are rotating cap 202, strap case 204, left strap 108, right strap 110, housing 206, fastener 208, bidirectional ratchet 212, clockwise pawl 214*a*, and counterclockwise pawl 214*b*. Also visible are a pinion 302 and unlocking ribs 304. In some embodiments, as seen in FIG. 3, pinion 302 and bidirectional ratchet 212 may be combined into a single part, which may be affixed to housing 206 by fastener 208. In some embodiments, unlocking ribs 302 may interact with pawls 214, including clockwise pawl 214*a* and counterclockwise pawl 215*b*, on bidirectional ratchet 212 to disengage pawls 214 with the teeth of stationary ratchet drum 602 of housing 206, and then apply a torque to bidirectional ratchet 212 to rotate or adjust bidirectional ratchet 212, which in turn applies a torque through torsion springs to pinion 302, which rotates and changes the strap size.

Figure 4:
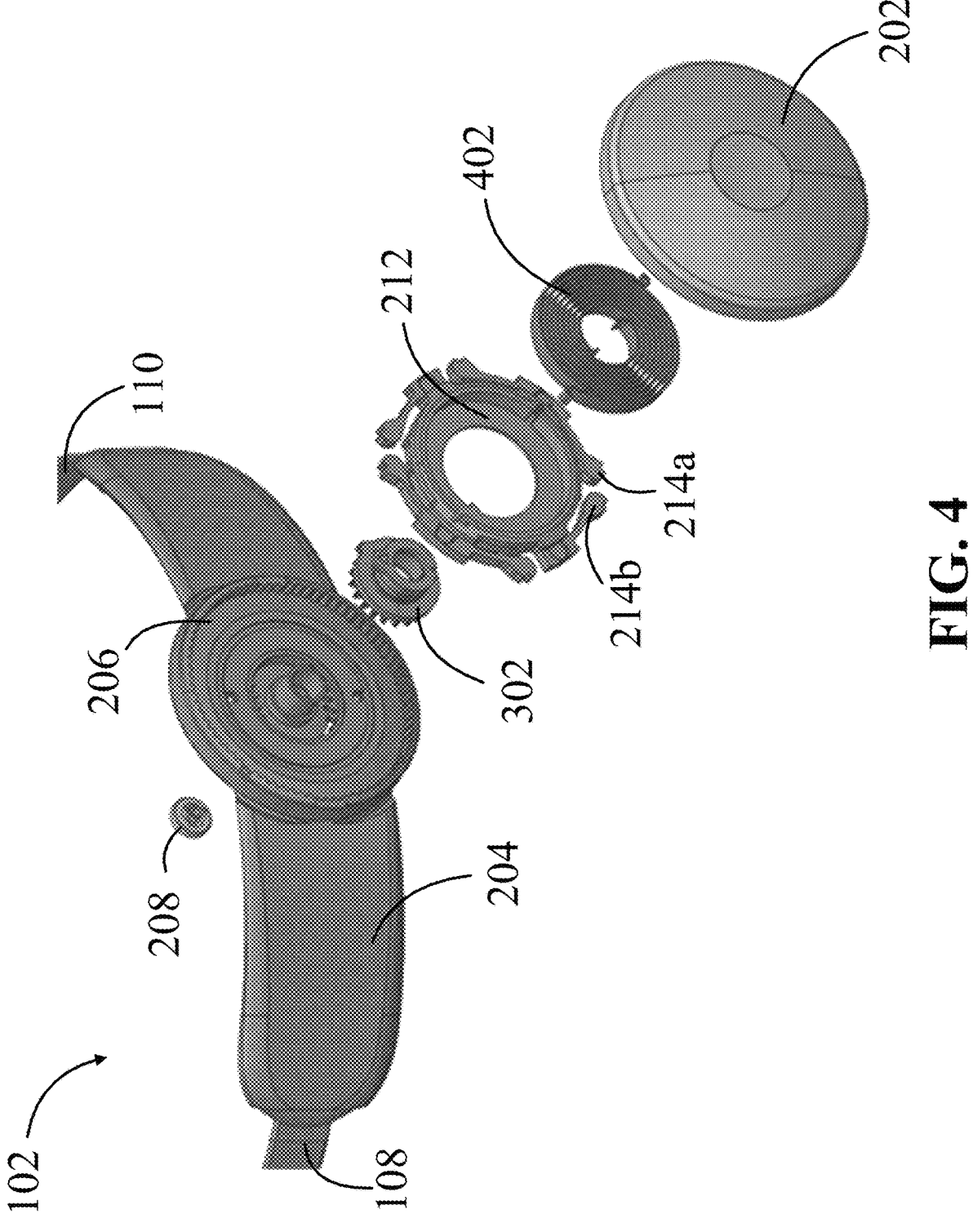
FIG. 4 illustrates an exploded perspective view of the components, including a spring, in an anti-slippage knob-ratchet for adjusting a strap on a VR headset as shown in FIG. 1, according to some embodiments.

FIG. 4 illustrates an exploded perspective view of the components, including a spring 402, in an anti-slippage knob-ratchet 102 for adjusting a strap on a VR headset 100 as shown in FIG. 1, according to some embodiments. Illustrated are rotating cap 202, strap case 204, left strap 108, right strap 110, housing 206, fastener 208, pinion 302, bidirectional ratchet 212, clockwise pawl 214*a*, counterclockwise pawl 214*b*, and spring 402. In some embodiments, as seen in FIG. 4, pinion 302 and bidirectional ratchet 212 may be separated into two distinct parts. In some embodiments, pinion 302 may be rigidly fixed to bidirectional fastener 212 by, for instance, an adhesive or a locking configuration between the two components. In some embodiments, one or more torsion springs may be anchored on bidirectional ratchet 212 and on pinion 302.

In some embodiments, spring 402, which is coupled to bidirectional ratchet 212, may enable a don-doff stretch function of anti-slippage knob-ratchet 102. A tension-compression of spring 402 may occur when a user handles VR headset 100, lengthening straps 108 and 110 upon tension of spring 402 and a slight rotation of bidirectional ratchet 212, and shortening straps 108 and 110 upon compression of spring 402 and an opposite rotation of bidirectional ratchet 212. The tension-compression of spring 402 may allow a user to put on or take off VR headset 100 without directly rotating (e.g., with a user's hand) anti-slippage knob-ratchet 102.

Figure 5:
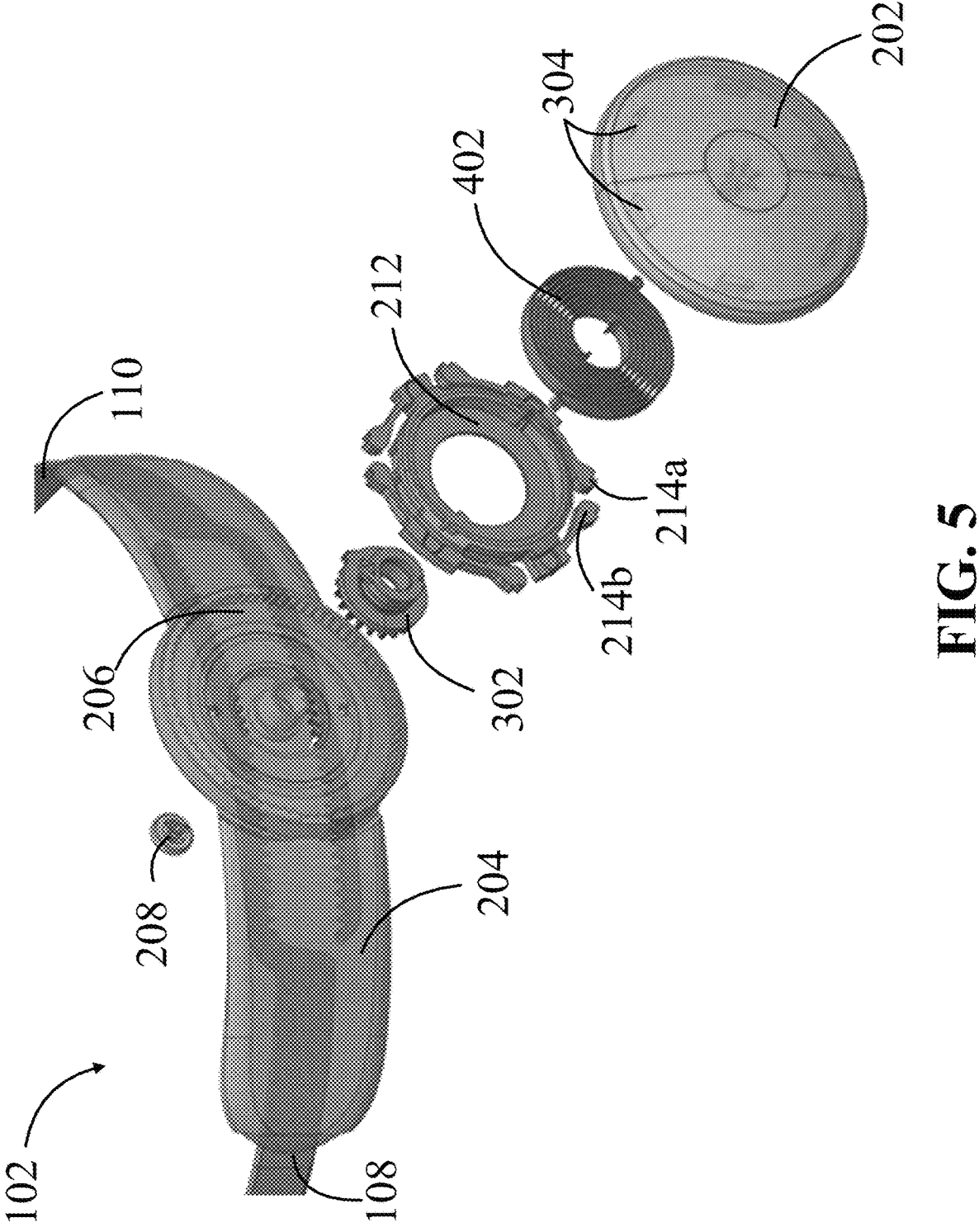
FIG. 5 illustrates an exploded transparent perspective view of the components, including a spring, in an anti-slippage knob-ratchet for adjusting a strap on a VR headset as shown in FIG. 1, according to some embodiments.

FIG. 5 illustrates an exploded transparent perspective view of the components, including a spring 402, in an anti-slippage knob-ratchet 102 for adjusting a strap on a VR headset 100 as shown in FIG. 1, according to some embodiments. Illustrated are rotating cap 202, strap case 204, left strap 108, right strap 110, housing 206, fastener 208, pinion 302, bidirectional ratchet 212, clockwise pawl 214*a*, counterclockwise pawl 214*b*, and spring 402. Also visible are unlocking ribs 304.

Figure 6:
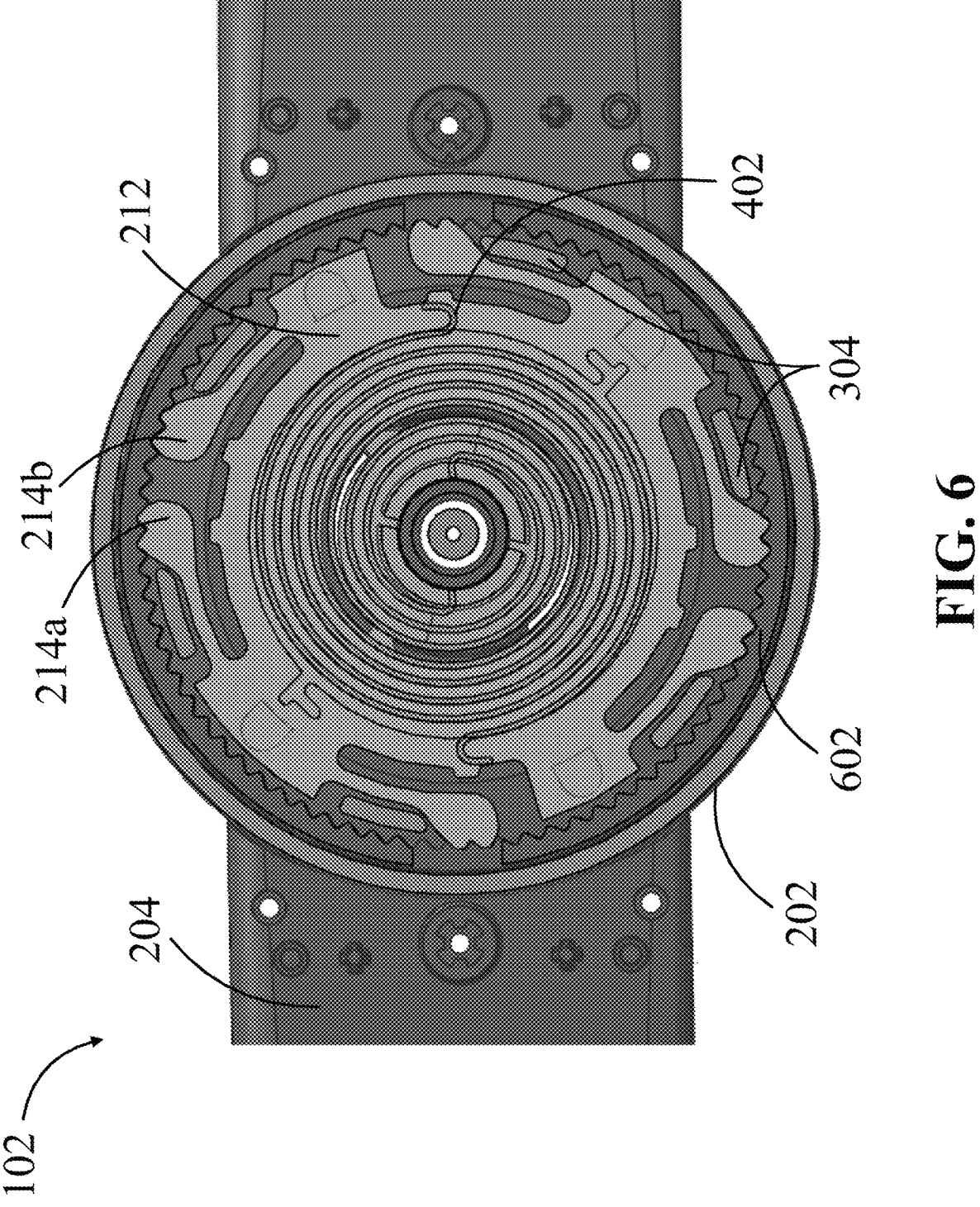
FIG. 6 illustrates a cutaway view of an anti-slippage knob-ratchet for adjusting a left strap and a right strap in a VR headset as shown in FIG. 1, according to some embodiments.

FIG. 6 illustrates a cutaway view of an anti-slippage knob-ratchet 102 for adjusting a left strap 108 and a right strap 110 in a VR headset 100 as shown in FIG. 1, according to some embodiments. Illustrated are rotating cap 202, strap case 204, bidirectional ratchet 212, clockwise pawl 214*a*, counterclockwise pawl 214*b*, and spring 402. Also visible are unlocking ribs 304 and stationary ratchet drum 602. In FIG. 6, rotating cap 202 is in a "lock" position, wherein all unlocking ribs 304 are disengaged so that clockwise pawls 214*a* and counterclockwise pawls 214*b* are engaged with stationary ratchet drum 204, thereby fixing pinion 302 and disallowing any stretching or contracting of the headset straps, including left strap 108 and right strap 110.

In some embodiments, bidirectional ratchet 212 includes a clockwise pawl 214*a* configured to engage with stationary ratchet drum 602 (e.g., stationary ratchet gear, stator, or stator gear) in an outer housing to allow movement of a pinion 302 in a clockwise direction. In some embodiments, bidirectional ratchet 212 also includes a counterclockwise pawl 214*b* configured to engage with stationary ratchet drum 602 to allow movement of pinion 302 in a counterclockwise direction.

In some embodiments, clockwise pawl 214*a* and counterclockwise pawl 214*b* engage with stationary ratchet drum 602 when unimpeded by one or more unlocking ribs 304 in a rotating cap 202 to prevent pinion 302 from rotating. In some embodiments, clockwise pawl 214a is one of multiple pawls 214 symmetrically disposed around pinion 302 and configured to allow pinion 302 to move in a clockwise direction, and counterclockwise pawl 214b is one of multiple pawls 214 symmetrically disposed around pinion 302 and configured to allow pinion 302 to move in a counterclockwise direction.

In some embodiments, counterclockwise pawl 214b is disengaged from stationary ratchet drum 602 by an unlocking rib 304 in a rotating cap 202 when clockwise pawl 214a is engaged with stationary ratchet drum 602, and clockwise pawl 214a is disengaged from stationary ratchet drum 602 by an unlocking rib 304 in a rotating cap 202 when counterclockwise pawl 214b is engaged with stationary ratchet drum 602.

In some embodiments, clockwise pawl 214a and counterclockwise pawl 214b are configured to engage stationary ratchet drum 602 when rotating cap 202 is set in a strap-locking configuration.

As used herein, the phrase "at least one of" preceding a series of items, with the terms "and" or "or" to separate any of the items, modifies the list as a whole, rather than each member of the list (e.g., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Terms such as "top," "bottom," "front," "rear" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference. Furthermore, to the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112, sixth paragraph, unless the element is expressly recited using the phrase "means for" or, in the case of a method claim, the element is recited using the phrase "step for".

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A ratchet, comprising:
a first pawl, configured to engage with a stationary ratchet drum in an outer housing to allow movement of a pinion in a clockwise direction, wherein the pinion is coupled to the ratchet by a spring; and
a second pawl, configured to engage with the stationary ratchet drum to allow a movement of the pinion in a counterclockwise direction.

2. The ratchet of claim 1, wherein the second pawl is disengaged from the stationary ratchet drum by an unlocking rib in a rotating cap when the first pawl is engaged with the stationary ratchet drum, and the first pawl is disengaged from the stationary ratchet drum by the unlocking rib in the rotating cap when the second pawl is engaged with the stationary ratchet drum.

3. The ratchet of claim 1, wherein the first pawl and the second pawl are configured to engage the stationary ratchet drum when a rotating cap is set in a strap-locking configuration.

4. The ratchet of claim 1, wherein each of the first pawl and the second pawl include a head forming a cantilever with a body of the ratchet to engage with the stationary ratchet drum when unimpeded by an unlocking rib in a rotating cap.

5. The ratchet of claim 1, wherein the first pawl and the second pawl engage with the stationary ratchet drum when unimpeded by one or more unlocking ribs in a rotating cap to prevent the pinion from rotating.

6. The ratchet of claim 1, wherein the first pawl is one of a first group of multiple pawls symmetrically disposed around the pinion and configured to allow the pinion to move in the clockwise direction, and wherein the second pawl is one of a second group of multiple pawls symmetrically disposed around the pinion and configured to allow the pinion to move in the counterclockwise direction.

7. A knob system for adjusting a strap length of a headset, comprising:
a rotating cap, including:
a strap-lengthening configuration,
a strap-shortening configuration, and
a strap-locking configuration;
a ratchet coupled to the rotating cap and configured to rotate in a first direction when the rotating cap is in the strap-lengthening configuration, to rotate in a second direction when the rotating cap is in the strap-shortening configuration, and to remain in a fixed position when the rotating cap is in the strap-locking configuration;

a pinion coupled to the ratchet at a hub, to a left headset strap on a first edge of the left headset strap, and to a right headset strap on a second edge of the right headset strap, wherein the pinion is coupled to the ratchet by a spring; and
a housing, including:
a strap coupling to receive the left headset strap and the right headset strap, and
a stationary ratchet drum to engage with the ratchet in a stop-hold configuration when the rotating cap is in the strap-lengthening configuration or in the strap-shortening configuration, and in a lock configuration when the rotating cap is in the strap-locking configuration.

8. The knob system of claim 7, wherein the ratchet includes a first pawl configured to engage with the stationary ratchet drum and a second pawl configured to disengage from the stationary ratchet drum by an unlocking rib in the rotating cap, when the rotating cap is on one of the strap-lengthening configuration or the strap-shortening configuration.

9. The knob system of claim 7, wherein the ratchet includes a first pawl and a second pawl configured to engage the stationary ratchet drum when the rotating cap is set in the strap-locking configuration.

10. The knob system of claim 7, wherein the ratchet includes a first pawl and a second pawl that include a head forming a cantilever with a body of the ratchet to engage with the stationary ratchet drum when unimpeded by an unlocking rib in the rotating cap.

11. The knob system of claim 7, wherein the ratchet includes a first group of multiple pawls symmetrically disposed around the pinion and configured to allow the pinion to move in a clockwise direction, and a second group of multiple pawls symmetrically disposed around the pinion and configured to allow the pinion to move in a counterclockwise direction.

12. The knob system of claim 7, wherein the pinion is coupled to the ratchet rigidly.

13. A headset, comprising:
a visor, including a display configured to provide an immersive reality view to a user;
a left strap attached to a left side of the visor; and
a right strap attached to a right side of the visor, the left strap and the right strap coupled on an opposite side of the visor via a knob, the knob including a bidirectional ratchet, wherein:
the bidirectional ratchet includes multiple pawls disposed around a pinion coupled to the bidirectional ratchet by a spring, and
the bidirectional ratchet enables a strap-lengthening configuration, a strap-shortening configuration, and a strap-locking configuration.

14. The headset of claim 13, wherein at least one of the left strap or the right strap are made of a rigid material having multiple teeth at an end that engages the pinion that pulls the left strap and the right strap together in the strap-shortening configuration and pushes the left strap and the right strap apart in the strap-lengthening configuration.

15. The headset of claim 13, wherein the knob includes a stationary ratchet drum and a rotating cap, and the bidirectional ratchet includes a first pawl configured to engage with the stationary ratchet drum and a second pawl configured to disengage from the stationary ratchet drum by an unlocking rib in the rotating cap, when the rotating cap is on one of the strap-lengthening configuration or the strap-shortening configuration.

16. The headset of claim 13, wherein the knob includes a stationary ratchet drum and a rotating cap, and the bidirectional ratchet includes a first pawl and a second pawl configured to engage the stationary ratchet drum when the rotating cap is set in the strap-locking configuration.

17. The headset of claim 13, wherein the knob includes a stationary ratchet drum and a rotating cap, and the bidirectional ratchet includes a first pawl and a second pawl that include a head forming a cantilever with a body of the bidirectional ratchet to engage with the stationary ratchet drum when unimpeded by an unlocking rib in the rotating cap.

18. The headset of claim 13, wherein a first group of the multiple pawls is symmetrically disposed around the pinion and configured to allow the pinion to move in a clockwise direction to pull the left strap and the right strap together; and a second group of the multiple pawls is symmetrically disposed around the pinion and configured to allow the pinion to move in a counterclockwise direction to push the left strap and the right strap apart.

* * * * *